United States Patent
Gallizzi et al.

(10) Patent No.: US 9,233,309 B2
(45) Date of Patent: Jan. 12, 2016

(54) SYSTEMS AND METHODS FOR ENABLING SHADOW PLAY FOR VIDEO GAMES BASED ON PRIOR USER PLAYS

(71) Applicant: Sony Computer Entertainment America LLC, Foster City, CA (US)

(72) Inventors: Ueli Gallizzi, Aliso Viejo, CA (US);
David Perry, Monarch Beach, CA (US);
Warren Benedetto, Foster City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 268 days.

(21) Appl. No.: 13/779,737

(22) Filed: Feb. 27, 2013

(65) Prior Publication Data

US 2014/0187318 A1 Jul. 3, 2014

Related U.S. Application Data

(60) Provisional application No. 61/746,401, filed on Dec. 27, 2012.

(51) Int. Cl.
*A63F 13/00* (2014.01)
*A63F 9/24* (2006.01)
*A63F 13/497* (2014.01)
*A63F 13/355* (2014.01)
(Continued)

(52) U.S. Cl.
CPC ............ *A63F 13/497* (2014.09); *A63F 13/355* (2014.09); *A63F 13/5375* (2014.09); *A63F 13/795* (2014.09)

(58) Field of Classification Search
CPC ..... A63F 13/25; A63F 13/493; A63F 13/497; A63F 13/50; A63F 13/52; A63F 2300/30; A63F 2300/303; A63F 2300/308; A63F 2300/60; A63F 2300/6045; A63F 2300/6054; A63F 2300/63; A63F 2300/634; A63F 2300/636; A63F 2300/638; A63F 13/355; A63F 13/5375; A63F 13/795
USPC .................................. 463/6, 30–34, 36, 40–42
See application file for complete search history.

(56) References Cited

U.S. PATENT DOCUMENTS 5,269,687 A * 12/1993 Mott et al. ........................ 434/69
5,354,202 A * 10/1994 Moncrief et al. ............... 434/69
(Continued)

OTHER PUBLICATIONS

Orland, Kyle. "Hard Drivin', Hard Bargainin': Investigating Midway's 'Ghost Racer' Patent" [dated Jun. 18, 2007], [online], [retrieved Feb. 17, 2015]. <URL:http://www.gamasutra.com/view/feature/129914/hard_drivin_hard_bargainin_.php>. 3 Pages.*

*Primary Examiner* — Milap Shah
(74) *Attorney, Agent, or Firm* — Martine Penilla Group, LLP

(57) ABSTRACT

Methods for playing a video game executed by a game cloud system are provided. One method includes generating a user interface for displaying game interactivity for playing the video game. The user interface includes controls for selecting a mode of play that includes a shadow mode. The method further includes detecting game play of the video game by a current user and identifying one or more previous plays of the video game by other users. After one of the other users is selected to be used in the shadow mode, for a set period of time, the shadow mode is enabled for the selected other user such that an image of the object controlled by the other user along a game sequence that is to be played by the current user of the video game is displayed.

19 Claims, 11 Drawing Sheets

(51) Int. Cl.
*A63F 13/795* (2014.01)
*A63F 13/5375* (2014.01)

(56) References Cited

U.S. PATENT DOCUMENTS

| | | | | |
|---|---|---|---|---|
| 5,816,913 | A * | 10/1998 | Nakamura | A63F 9/143 463/6 |
| 6,488,505 | B1 * | 12/2002 | Hightower | 434/69 |
| 6,755,654 | B2 * | 6/2004 | Hightower | A63F 13/10 434/350 |
| 8,133,115 | B2 * | 3/2012 | Campbell | A63F 13/10 463/31 |
| 2002/0019258 | A1 * | 2/2002 | Kim et al. | 463/36 |
| 2004/0224740 | A1 * | 11/2004 | Ball et al. | 463/6 |
| 2004/0224741 | A1 * | 11/2004 | Jen et al. | 463/6 |
| 2004/0225386 | A1 * | 11/2004 | Thompson et al. | 700/92 |
| 2005/0096136 | A1 * | 5/2005 | Ohta | A63F 13/10 463/43 |
| 2005/0277455 | A1 * | 12/2005 | Chudley et al. | 463/6 |
| 2006/0135236 | A1 * | 6/2006 | Sato et al. | 463/6 |
| 2007/0060359 | A1 * | 3/2007 | Smith | 463/42 |
| 2008/0167122 | A1 * | 7/2008 | Maeda et al. | 463/30 |
| 2010/0160038 | A1 * | 6/2010 | Youm et al. | 463/29 |
| 2010/0203933 | A1 * | 8/2010 | Eyzaguirre et al. | 463/2 |
| 2012/0283011 | A1 * | 11/2012 | Van Luchene | 463/29 |
| 2012/0295718 | A1 * | 11/2012 | Paquet et al. | 463/43 |
| 2012/0302351 | A1 * | 11/2012 | Murphy et al. | 463/42 |
| 2013/0190096 | A1 * | 7/2013 | Ronen et al. | 463/43 |
| 2014/0066191 | A1 * | 3/2014 | Yang | 463/29 |

* cited by examiner

SYSTEMS AND METHODS FOR ENABLING SHADOW PLAY FOR VIDEO GAMES BASED ON PRIOR USER PLAYS

CLAIM OF PRIORITY

This application claims the benefit of and priority to, under 35 U.S.C. 119 §(e), to U.S. Provisional Patent Application No. 61/746,401, filed on Dec. 27, 2012, and titled "Systems and Methods for Enabling Shadow Play for Video Games Based on Prior User Plays", which is hereby incorporated by reference in its entirety.

BACKGROUND

1. Field of the Invention

The present invention relates to systems and methods for enabling play of video games in a game cloud executed system.

2. Description of the Related Art

Cloud systems, using computing resources (hardware and software), deliver services over a network (typically the Internet). The services, in the context of gaming, enable streaming of content to remote clients, wherein most processing is done on servers, which may be distributed. Input provided at the remote clients will in turn drive execution of the game, without the need for dedicated gaming hardware at the client's location. Cloud gaming, therefore, has been increasing in popularity because users find it easier to access more titles without complex hardware restrictions and game suppliers find it easier manage game code from centralized locations.

It is in this context that embodiments of the invention arise.

SUMMARY

Embodiments of the present invention relate to systems and methods for playing a video game over an online network. In particular, the video game is executed by a game cloud system. In one configuration, the game play will allow users to play using a shadow mode. As will be described below in greater detail, a shadow mode will enable users to follow actions, paths, operations, or along a game sequence taken by an earlier play, by another, of the game. Several inventive embodiments of the present invention are described below.

In one embodiment, a method for playing a video game executed by a game cloud system is disclosed. The disclosed method includes generating a user interface for displaying game interactivity for playing the video game. The user interface includes controls for selecting a mode of play that includes a shadow mode. The method further includes detecting game play of the video game by a current user and identifying one or more previous plays of the video game by other users. After one of the other users is selected to be used in the shadow mode, for a set period of time, the shadow mode is enabled for the selected other user such that an image of the object, controlled by the selected other user along a game sequence that is to be played by the current user of the video game, is displayed. The disclosed method is executed by a processor.

In another embodiment, a computer readable non-transitory storage media having program instructions for playing a video game executed by a game cloud system over an online network is disclosed. The computer readable non-transitory storage media includes program instructions for generating a user interface for displaying game interactivity for playing the video game. The user interface includes controls for selecting a mode of play that includes a shadow mode. The computer readable non-transitory storage media further includes program instructions for detecting game play of the video game by a current user and program instructions for identifying one or more previous plays of the video game by other users. The computer readable non-transitory storage media also includes program instructions for receiving selection from the current user identifying one other user to be used in the shadow mode and program instructions for enabling the shadow mode for the other user for a set period of time, such that an image of the object, controlled by the selected other user along a game sequence that is to be played by the current user of the video game, is displayed.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
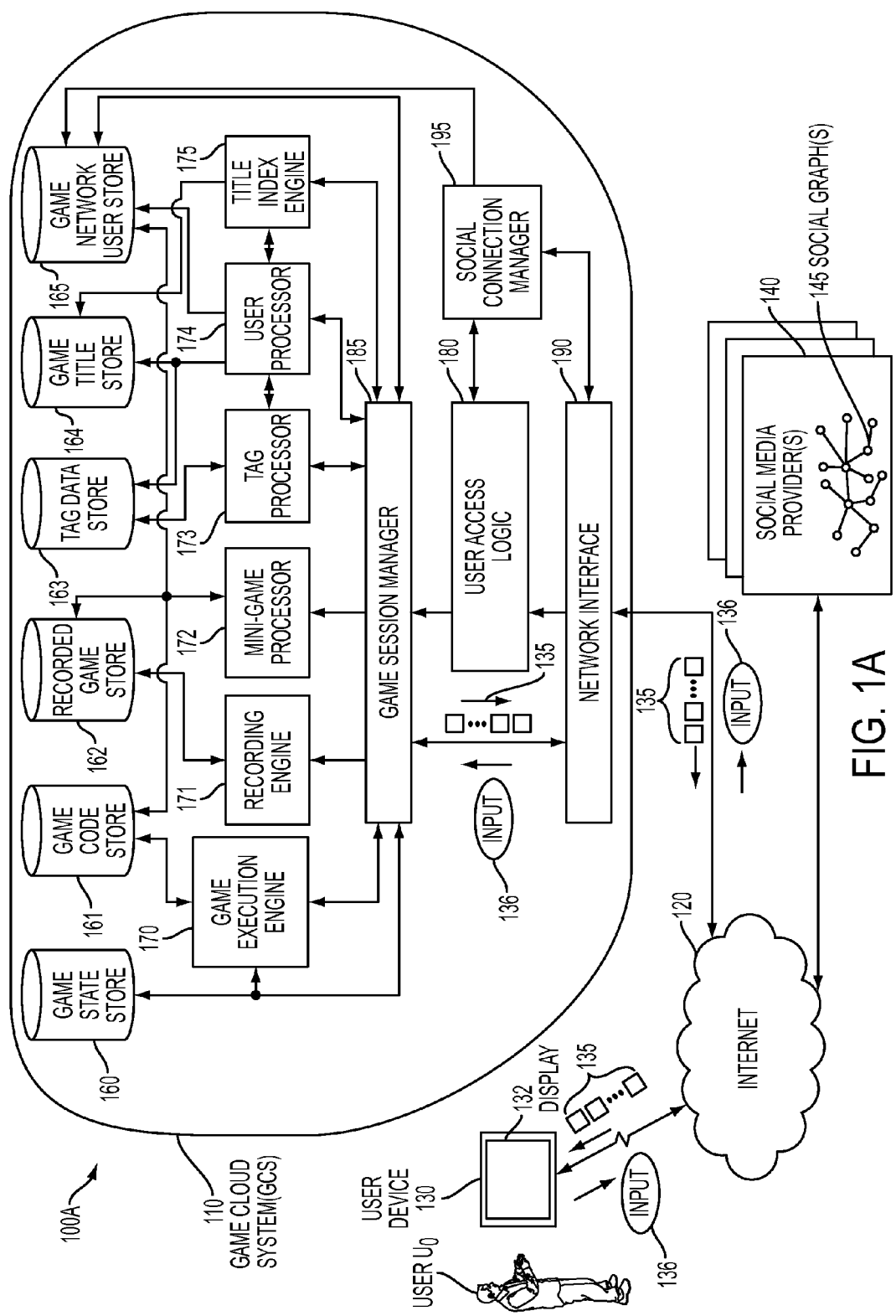
FIG. 1A illustrates a system diagram for enabling access and playing of video games stored in a game cloud system, in accordance with an embodiment of the invention.

The following embodiments describe systems and methods for playing a video game executed by a game cloud system over an online network. The game cloud system may provide access and selection of a plurality of video games, and each video game has particular characteristics. The characteristics of each video game define the type of game sequences that must be taken to play the game. For example, a battle game may require moving characters around a scene to accomplish tasks, a driving game may require moving a vehicle around a track or obstacles, a board game may require moving game pieces to different locations at different times, etc. Further, the video games played may be either full video game titles or mini-games defined from part of a full video game. When a user decides to play a video game, the user will be provide with an option to play the game in shadow mode. Shadow mode is a function that enables game play in a form that enables following, tracking, or seeing what another player did during their game play while the user plays the game. The earlier game play may be shown as an overlay graphic, integrated graphics, tracks, shadows, semi-transparent or fully rendered moving objects (e.g., characters, game pieces, game objects, etc.), etc. Providing the shadow mode may enable a user to follow, partially follow, or see the earlier play during the play session of the user.

In one embodiment, the shadow mode of a game play may include a follow-shadow mode play and a pause-shadow mode play. During the follow-shadow mode play, the object of the video game controlled by the current user is enabled to move behind the shadow form of the object of a selected prior user, while the current user is playing the video game. The follow-shadow mode includes settings for defining a follow separation that defines a time gap between the actions performed by the selected prior user in the prior game play to move the image of the object of the video game in a shadow form along the game sequence and the actions to be performed by the current user to move the image of the object of the video game along the game sequence. The game sequence is defined by characteristics of the video game.

In another embodiment, during the pause-shadow mode play, the object of the video game controlled by the current user is paused during a defined time gap. During the time gap, the shadow form of the object is shown progressing between a beginning point of a pause separation to an ending point of the pause separation. The pause separation is defined by a time gap between the actions performed by a selected prior user to move the image of the object of the video game in a shadow form along the game sequence during the prior game play and the actions to be performed by the current user to move the image of the object of the video game along the game sequence.

The game play, in one embodiment, is via a cloud based processing system that enables streaming of online game play, while allowing users to provide interactive input from remote locations that are connected to the internet. In one embodiment, method for defining mini-games is provided. For example, while the user plays the game, a video recording of the game is created, showing the game play activity from the game play session. In one embodiment, a user is allowed to select a portion of the video recording. The selection of the portion of the video recording is used, in one embodiment, to define the portion of the mini-game that is to be created. The user defined mini-game will therefore be a segment or part of the full game, with a defined start and end point as defined by the user. In one embodiment, the segment may have all of the features of the full game, and in other embodiments less features, objects, controls, etc., than the full game has. In one embodiment, the user defines the start and end points by selecting the start and end points in the video recording.

It will be obvious, however, to one skilled in the art, that the present invention may be practiced without some or all of these specific details. In other instances, well known process operations have not been described in detail in order not to unnecessarily obscure the present invention.

FIG. 1A illustrates a system diagram 100A for enabling access and playing of video games stored in a game cloud system (GCS) 110, in accordance with an embodiment of the invention. System 100A includes a GCS 110, one or more social media providers 140, and a user device 130, all of which are connected via Internet 120. Although one user device 130 is illustrated in system diagram 100A, it is to be understood that in practice, many more user devices may be connected to Internet 120 to access the services provided by GCS 110 and social media providers 140.

In one embodiment, game cloud system 110 includes a game execution engine 170, a recording engine 171, a mini-game processor 172, a tag processor 173, a user processor 174, a title index engine 175, a game session manager 185, user access logic 180, a network interface 190, and a social connection manager 195. Game cloud system 110 may further include a plurality of gaming storage systems, such as a game state store 160, a game code store 161, a recorded game store 162, a tag data store 163, a game title store 164, and a game network user store 165. In one embodiment, game cloud system 110 is a system that can provide game applications, services, gaming related digital content, and interconnectivity among systems, applications, users, and social networks. Game cloud system 110 may communicate with user device 130 and social media providers 140 via network interface 190 that will enable wired and wireless communication methods. In one embodiment, each social media provider 140 includes at least one social graph 145 that shows social network user interconnections.

In one embodiment, a social media provider can be the game cloud system 110 itself, whereby user relationships are managed without the need for external social media providers 140. In still other embodiments, the system can operate as a hybrid system, wherein social relationships are managed using social graph data from third party social media providers (via API interface accesses or the like) and user relationships with other users, as defined by the game cloud system.

In one embodiment, a user, e.g., user $U_0$, can access the services provided by game cloud system 110 and social media providers 140 by way of user device 130. User device 130 can include any type of device having a processor and memory, wired or wireless, portable or not portable. User device 130, which is shown connected to Internet 120, includes a display 132 that can be a touchscreen, or a display typically provided by a flat-panel display, a cathode ray tube (CRT), or other device capable of rendering a display. Alternatively, user device 130 can have its display 132 separate from the device, similar to a desktop computer or a laptop computer. In one embodiment, user device 130 can be in the form of a smart-phone, a tablet computer, or hybrids that provide touch screen capability in a portable form factor. One exemplary device can include a portable phone device that runs an operating system and is provided with access to various applications (apps) that may be obtained over Internet 120, and executed on the local portable device (e.g., smartphone, tablet, laptop, desktop, etc.).

In one embodiment, user device 130 can install an application that enables executions and views of the games stored and shared by the game cloud system 110. Further, user device 130 can be used to communicate with one or more social media provider(s) 140 via Internet 120 such that user device 130 may be used to execute a game play or view video recordings of the game plays shared in one or more social media providers 140. For example, user $U_0$ may access a game posted in one of social media providers 140 by selecting a link on a page, stream, news-feed, or post of the social media provider, and then playing or viewing the game from user device 130.

In one embodiment, while user $U_0$ is playing or executing a game stored in game cloud system 110, user device 130 is capable of receiving game video frames 135 from game cloud system 110 and transmitting user interactivity input 136 to game cloud system 110. The received game video frames 135 can be shown in display 132 of user device 130.

User interactivity input 136 may include the game control inputs generated by user $U_0$ to drive the video game during the game play, the user selections for game play mode settings, and tag data entered by the user during the execution or view of the video game. User $U_0$ may generate the user interactivity input 136 via any device that is capable of transmitting user interactivity input 136 to game cloud system 110. For example, user $U_0$ may generate user interactivity input 136 via a game controller, a mouse, a keyboard, or a touch device, which communicates with user device 130.

In one embodiment, a user, e.g., user $U_0$, may create a user account and register the created user account with game cloud system 110. After the user account is registered with game cloud system 110, game cloud system 110 may provide a user ID to this registered user account and save the user ID in a user profile associated with the registered user account. The user profile associated with a user account will be described in more detail with reference to FIG. 1C. In one embodiment, the user profile associated with a user account may be saved in a user database in game network user store 165.

In one embodiment, user access logic 180 may be used to detect all accesses made by user $U_0$, either through user device 130 or other suitable devices, and be used to verify the user log-in information (e.g., the name and password for the user account of user $U_0$). After user $U_0$ logs in to his or her user account, user access logic 180 may communicate the user login information with user processor 174 that in turn updates the user login information stored in the user profile. Further, user access logic 180 may communicate the user login information with social connection manager 195, so that social connection manager 195 can pull the names of the user's social network friends from one or more social media providers 140 via network interface 190. The names of the user's social network friends may be received by social connection manager 195, which in turn transmits the received information to game network user store 165 to be saved in the user profile associated with user $U_0$.

After logging in, the user can access services provided by game cloud system 110 via game session manager 185. For example, game session manager 185 may inform user processor 174 of the user login information so that user processor 174 may record or update the user login information in the user profile associated with this user. In one embodiment, the user profile is stored in game network user store 165. User processor 174 may also communicate with title index engine 175 to identify game titles associated with the user account. The game titles associated with the user account may be previously purchased by the user, previously played by the user and/or free game titles identified and made available by the game providers. In this example, available game titles may therefore be stored in game title store 164.

In one embodiment, after a user chooses an available game title to play, a game session for the chosen game title may be initiated by the user through game session manager 185. Game session manager 185 first accesses game state store 160 to retrieve the saved game state of the last session played by the user (for the selected game), if any, so that the user can restart the game play from a previous game play stop point. Once the resume or start point is identified, the game session manager 185 may inform game execution engine 170 to execute the game code of the chosen game title stored in game code store 161. After a game session is initiated, game session manager 185 may pass the game video frames 135 (i.e., streaming video data), via network interface 190 to a user device, e.g., user device 130.

During a game play, game session manager 185 may communicate with game execution engine 170, recording engine 171, and tag processor 173 to generate or save a recording (e.g., video) of the game play or game play session as the game play processes. In one embodiment, the video recording of the game play can include game tag data entered or provided during game play, and other game related metadata. The video recording of game play may be saved in recorded game store 162. Any game tag data may be saved in tag data store 163, and the metadata may be saved in game state store 160.

In one embodiment, a mini-game may be created using information from the video recording of the game play, e.g., via mini-game processor 172. For example, after a user plays a game and the video recording is created, the user can simply watch a reply of the video recording of his or her prior game play. When the user is watching a reply of the video recording, the user may find one or more parts to be particularly interesting. For example, the user may have achieved a high score or completed an interesting task during the game play. The user, in one embodiment, is provided with controls to select a portion of the video recording, which will then be used by mini-game processor 172 to construct a mini-game based on the selected portion of the video recording of the game play. In one embodiment, the mini-game will include the executable code necessary to render the functionality or part of the functionality that was used to create the content of the selected portion of the video recording.

Thus, a user wishing to play the mini-game will be provided with a substantially similar game play experience as the user that originally played the game that created the video recording. For instance, if the original game play included a scene where the user is riding a bike over a jump, and the user selects that portion from the video recording of his game play, the new mini-game would include code to enable similar or substantially similar game play. That is, the mini-game would enable the user or other users to play the mini-game, wherein game play would include riding a bike over a jump. In this case, the user playing the mini-game may or may not achieve the same game score for the jump.

In one embodiment, the portion of the video recording associated with the created mini-game may be saved in recorded game store 162 and remaining portion of the video recording may be erased after a defined time period by recording engine 171. If no mini-games are created for a video recording of a game play, the video recording of the game play may be erased after a defined time period by recording engine 171.

In one embodiment, the created mini-game may be posted by user $U_0$ to a webpage in a social network, via social connection manager 195, to enable sharing with his or her social network friends. Alternatively, the created mini-game may be posted by user $U_0$ to a webpage in a game network maintained by game cloud system 110, for sharing with his or her game network friends. Sharing, however, should not be limited to friends. Sharing can also be extended to other users that may have similar likes or game play similarities.

Similar to the way a full game is viewed or executed, in one embodiment, while user $U_0$ is executing or viewing a mini-game stored in game cloud system 110, user device 130 is capable of receiving game video frames 135 from game cloud system 110 and transmitting user interactivity input 136 to game cloud system 110. The received game video frames 135 can be shown in display 132 of user device 130.

In one embodiment, the game code that defines a mini-game can be the same code of the full game from which the mini-game was created. During the creation of the mini-game by mini-game processor 172, game play metadata, which can include game state, is used to identify what parts of the game code of the full game are needed to make an executable mini-game. When the parts of the code of the full game are all identified, the code that defines the mini-game can, in one embodiment, be defined by pointers or references to the game code of the full game. By using points and/or references, the need to create new code packages for each produced mini-game is reduced. As users create mini-games from their game titles, the code or pointers for the created mini-games can be associated to the creating user in game network user store 165. This way, each created mini-game can be defined by its original creator, and metrics regarding play of the mini-games can be attributed or linked to the creating user. For instance, if a particular user creates a mini-game that is played and/or shared often with other users, the popularity of the mini-game can be tracked and ranked against other mini-games and users.

A user who creates mini-games that are shared often or tagged with higher frequency can be provided with rewards. The rewards can be provided, for example, by the developer of the game title from which the mini-games are created. As more mini-games are made from particular game titles, the game title may grow in popularity and will encourage users to purchase a full version. In one embodiment, full versions of a game title are unlocked to enable mini-game creation. In one embodiment, play of a mini-game will allow creation of video recordings of the mini-game play, but may not enable creation of mini-games without having access to the full game title.

In one example, mini-game processor 172 may instruct social connection manager 195, via game session manager 185, to post some or all of the mini-games stored in recorded game store 162 at one or more social media providers 140 so that those mini-games can be shared (either viewed or played) by the social network users. Social connection manager 195 may periodically pull social network data associated with those shared mini-games from social media providers 140, and save the social network data in social network data store 167.

In one embodiment, mini-game processor 172 may be used to analyze the tag data of a mini-game, and identify video frames with more tag content as a representative frame for the mini-game. For example, when a mini-game is created, the mini-game may be shown as an icon or still image. The still image may be, for example, one of the video frames of the mini-game. The more interesting the frame is, the more likely it is that the mini-game may be played by others. Thus, in this embodiment, the frame that is selected to be the still image may be automatically selected based on the tagging content associated with particular frames.

In another embodiment, mini-game processor 172 may be used to manage the mini-games stored in recorded game store 162. The mini-game management may include, but not limited to, mini-game classification, mini-game ranking based on the user interactions to the mini-games, mini-game representative picture identification, mini-game view or execution initiation, etc. For instance, if certain mini-games have a higher number of user interactions, this may indicate that the content of the mini-game is interesting and/or is being shared the most. As such, some mini-games can be displayed more prominently on a website, relative to other mini-games, based on the degree of tagging that such mini-games experience.

Still continuing with FIG. 1A, in one embodiment, during a game play, user interactivity input 136 entered by user $U_0$ may be transmitted to game session manager 185 of game cloud system 110. User interactivity input 136, besides input used to drive game play, may include tag data (e.g., texts, images, video recording clips, etc.) and game play mode setting selections. In one embodiment, the user interactivity input 136 may be recorded by recording engine 171 in recorded game store 162.

In one example, if user interactivity input 136 is tag data, the tag data may be received by game session manager 185, which in turn informs tag processor 173 and user processor 174 that the tag data is received. Tag processor 173 may be used to save the tag data to tag data store 163. User processor 174 may be used to save a tag pointer that points to where the tag data is stored in tag data store 163 to the user profile associated with user $U_0$.

In another example, if user interactivity input 136 is game play mode setting selections, the game play mode setting selections entered by user $U_0$ may be received by game session manager 185, which in turn informs user processor 174 that is used to save the game play mode setting selections to the user profile associated with user $U_0$. In one embodiment, one of the game play mode setting selections is shadow mode that enables an image of an object controlled by a prior game player to be displayed in a shadow form along a game sequence that is to be played by user $U_0$. The game sequence of the game play is defined by characteristics of the video game played by user $U_0$.

Figure 1B:
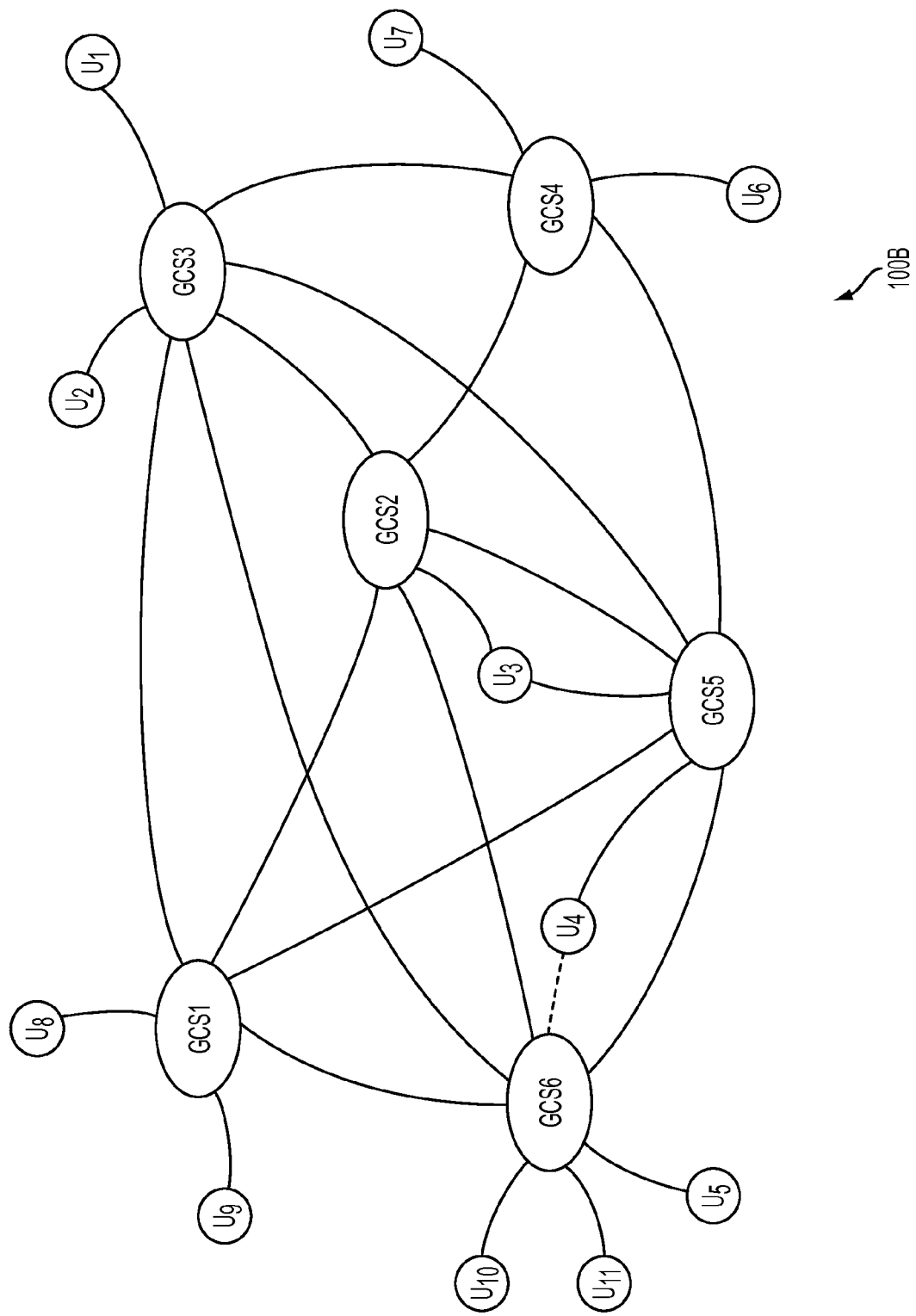
FIG. 1B illustrates a game cloud network, in accordance with one embodiment of the present invention.

FIG. 1B illustrates a game cloud network 100B, in accordance with one embodiment of the present invention. For example purposes only, the game cloud network 100B may include six game cloud systems (GCS1 to GCS 6), which are geographically distributed and interconnected. Also for purposes of example, eleven users (U1 to U11) are shown in FIG. 1B with different geographical distances to each of the six GCSs. To reduce latency, the GCSs are distributed and users that are more proximate to certain GCSs will be paired to the more local GCS.

As shown in FIG. 1B, users U1 and U2 are geographically located closer GCS3, user U3 is located about in the middle of the distance between GCS2 and GCS5, user U4 is located in between GCS 5 and GCS 6 but is closer to GCS 6, users U6 and U7 are located near GCS4, users U8 and U9 are located near GCS1, and users U5, U10, and U11 are located near GCS6. Although six game cloud systems and eleven users are shown, it is to be understood that in practice, more or less game cloud systems may be included in game cloud network 100B, and more or less users may access the services provided by game cloud network 100B.

In one embodiment, each GCS in game cloud network 100B is located in a data center that houses computer systems and associated components to support multiple operating systems. As an example, the structure of each GCS may be similar to GCS 110 as shown in FIG. 1A. Although, it should be understood that a GCS may include fewer or more processing components or logic elements, depending on the processing desired. In one embodiment, each GCS in game cloud network 100B may communicate with other GCSs so that the information for various user profiles stored in respective game network user stores of a GCS can get updated and synchronized. Through the communication among the GCSs, game cloud network 100B can dynamically distribute the work load to provide load balancing and assign users based on the work load of each GCS and distance factors.

In one embodiment, when a user is trying to log into his or her user account online via a user device, depending upon the geographical location of the user, the user may be routed to a GCS that is closest to his or her user device. For example, because user U1 along with his or her user device is located near GCS3, user U1 utilizes the game services provided GCS3 after his or her user device is connected to GCS3.

Similarly, user U2 may utilize the game services provided by GCS3, user U7 and user U6 may utilize the game services provided by GCS4, user U8 and user U9 may utilize the game services provided by GCS1, and user U5, user U10, and user U11 may utilize the game services provided by GCS6, based on geographical distance to respective CGSs.

In another embodiment, when a user is located approximately in the middle of two GCSs, the user may access the game services provided by both GCSs. For example, user U3 is located approximately in the middle of GCS2 and GCS5. When user U3 is trying to log into his account, the user device of user U3 may be connected to either GCS2 or GCS5, or both GCSs, depending upon the work load and latency of the GCSs. In still another embodiment, a user may be connected to a GCS that is not the closest one to this user because the GCS that is closest to this user is experiencing heavy work load. For example, user U4 may be initially connected to GCS6 because user U4 is located closest to GCS6. Due to heavy work load of GCS6, user U4 may be disconnected from GCS6 and be connected to GCS5. During the period of switching from GCS6 to GCS5, user U4 may be temporarily connected to both GCS6 and GCS5 for a while, and then get disconnected from GCS6 after GCS5 has replicated the game state of user U4 in GCS6. Thus, the switching from one GCS to another GCS is transparent to the user without affecting the user's experience with the game. In another example, user U4 may be directly routed to GCS5 because GCS5 has larger capacity than GCS6.

Figure 1C:
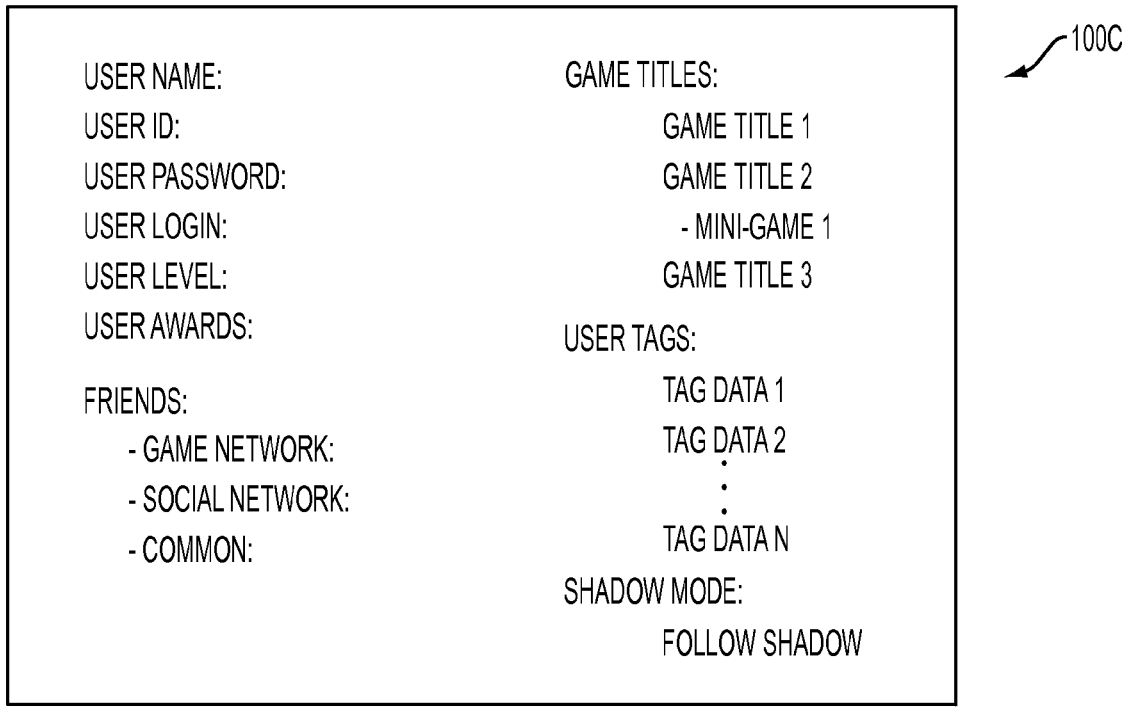
FIG. 1C illustrates an exemplary user profile stored in a game cloud system, in accordance with one embodiment of the present invention.

FIG. 1C illustrates an exemplary user profile 100C stored in a game cloud system 110, in accordance with one embodiment of the present invention. In one embodiment, user profile 100C may be saved in a user database stored in game network user store 165 of game cloud system 110. In this example, user profile 100C includes a "User Name" field, a "User ID" filed, a "User Password" field, a "User Login" field, a "User Level" field, a "User Awards" field, a "Friends" field, a "Game Titles" field, a "User Tags" field, and a "Shadow Mode" field.

In one embodiment the "Friends" field may be populated automatically by accessing external social networks. In this embodiment, the game cloud system may include code instructions that enable calls to external application programming interfaces (APIs) of social networks. The APIs can be used to query the social networks for data concerning the social grid, and relationships stored in the social grid of the social network. The data obtained from the social grid may be used to introduce the mini-games to friends of the user, such as by automatically posting mini-games to newsfeeds of friends or the like. These functions will enable wider sharing, tagging, rating, and commenting on mini-games as they are shared and used in greater extents.

In one embodiment, the "User Name" field, the "User ID" field, and the "User Password" field are used to record the name of the user, the ID assigned to the user when he or she created the user account in game cloud system 110, and the password set up by the user. The "User Login" field is used to indicate whether this user is currently logged into his or her user account. As discussed above, the user login information may be updated by user processor 174. The "User Level" field is used to indicate the game play levels of the user. The "User Awards" field shows the awards received by the user during previous game plays.

In one embodiment, the "Game Titles" field shows all available game titles for the user. The available game titles may be those that the user is able to freely play because either the user purchased the game or the game is free to play. In still other embodiments, the "Game Titles" field can show or identify the games that the user is able to see, such as, based on the rating of the games. If the play is a minor, only selected games would be made accessible for that player.

As discussed above, a user may create one or more mini-games based on a video recording of a game title played by the user. If one or more mini-games are created for the game title, the created mini-games will be shown under this game title. In this example, there are three available game titles for the user (Game Title 1, Game Title 2, and Game Title 3), and one mini-game (Mini-Game 1) is created from Game Title 2. In one embodiment, the user can start to play a game by selecting (clicking, touching, etc.) on the available game title shown in user profile 100C. In still other embodiments, mini-games can be shown on a separate webpage, where a user can select to play mini-games created by the user or created by other users. The mini-games shown can be organized based on game-types, genres, age appropriate, etc. Mini-games having larger numbers of user interactions (e.g., plays or tags) maybe ranked higher or placed in a more prominent location on the webpage. From this webpage of mini-games, users can access to play such mini-games or share the mini-games with others within the game network or externally via social networks.

In one embodiment, the "User Tags" field in user profile 100C lists tag data entered by the user. As discussed above, the entered tag data is stored in tag data store 163. For each tag data listed in the "User Tags" field, there is an associated tag pointer that points to the tag data stored in the tag data store 163. The tag data stored under the "User Tags" field may be (a) tag data entered by the user during a game play of the original full game title, (b) tag data entered by the user while viewing the video recording from the game play of the full game title, (c) tag data entered by any user viewing the portion of the video recording used to make or define the mini-game, or (d) tag data entered by any user while playing the mini-game for the video portion (the portion being the portion that was selected from the video recording to define the mini-game).

In one embodiment, a mini-game may be created by a user that owns or has access to a full version of the game that is used to create the mini-game. When a user plays the full version of the game, a video recording is created of the game play. From this video recording, the user can select a portion of the video recording (e.g., a starting point and an ending point). This portion of the video is saved and associated to the user. In addition, this portion is used to identify metadata and state data that was created when the full version of the game was played to create the video recording. This information is in turn used to identify the code parts of the full game code that will be required to create an executable mini-game that will encompass at least the functionality seen in the portion of the video that was selected from the video recording. In one embodiment, once the mini-game is created, the mini-game may have two parts.

For example, a first part is the portion of the video selected by the user, from the full video recording. This portion can be posted and shared, so that other users can see a video of the user's game play and the results (which may have been interesting). Once a person views the video portion, the person can elect to play a mini-game for that portion of video.

Also for example, a second part is the executable mini-game. As in the example above, if the portion of the video shows the user jumping an obstacle on a bike, the mini-game will provide code to allow another play to attempt the jump of the obstacle on the bike. The game scores achieved by the original player using the full game can then be compared to the score achieved by the other play. The other play may also get a good score, which may be interesting to share.

Thus, to provide further sharing, a third part may be the creation of a secondary video portion that is a recording of game play of the mini-game by other users. Thus, as more players play the mini-game, there will be many secondary recordings of those game plays, which will also be saved and associated with the original mini-game and to the players.

In this example, however, the creator of the mini-game is going to be the owner of the full version of the game. If the person playing the mini-game wishes to make a mini-game him or herself, that person can purchase the full copy (or full locked access) and produce his or her own mini-games that can be shared in the same way.

In one embodiment, the "Friends" field in user profile 100C shows the user's friends in both game network and social network. In this example, the user's game network friends are shown under the "Game Network" sub-field and the user's social network friends are shown under the "Social Network" sub-field. The user's friends who belong to both the game network and the social network may be listed under the "Common" sub-field.

In one embodiment, the shadow mode of a game play may be enabled to display an image of an object, in the form of a shadow, controlled by a selected prior user along a game sequence that is to be played by the user associated with the user profile 100C. The shadow form may be defined as one of a fully animated version, a minimally animated version, a grayed animation, a dashed-line animation, a partially transparent animation, or combinations or variance of degree thereof.

The shadow mode of a game play may include the follow-shadow mode and the pause-shadow mode. In this example, the follow-shadow mode is selected for the "Shadow Mode" field. When the follow-shadow mode is selected, the object of the video game controlled by the user associated with the user profile 100C is enabled to move behind, based on a time gap, the shadow form of the object of the selected prior user along the game sequence during one of the previous plays, while the user associated with the user profile 100C is playing the video game. The time gap of the follow-shadow mode defines a follow separation between the actions performed by the selected prior user to move the image of the object of the video game in a shadow form along the game sequence during one of the previous plays and the actions to be performed by the user associated with the user profile 100C to move the image of the object of the video game along the game sequence.

If the pause-shadow mode is selected, the object of the video game controlled by the user associated with the user profile 100C is paused during a time gap. During the time gap, the shadow form of the object controlled by a selected prior user is shown progressing between a beginning point of a pause separation to an ending point of the pause separation. The pause separation is defined by the time gap between the actions performed by the selected prior user to move the image of the object of the video game in a shadow form along the game sequence during the previous play and the actions to be performed by the user associated with the user profile 100C to move the image of the object of the video game along the game sequence.

For a user profile stored in game network user store 165, the "User Name" field, the "User Login" field, the "User Level" field, the "User Awards" field, and the "Shadow Mode" field may be viewable to other users in the game network, while the other fields in the user profile may not be viewable to other users. In one embodiment, a user may select whether to make the "Friends" field in his or her user profile to be viewable by other users.

Figure 2A:
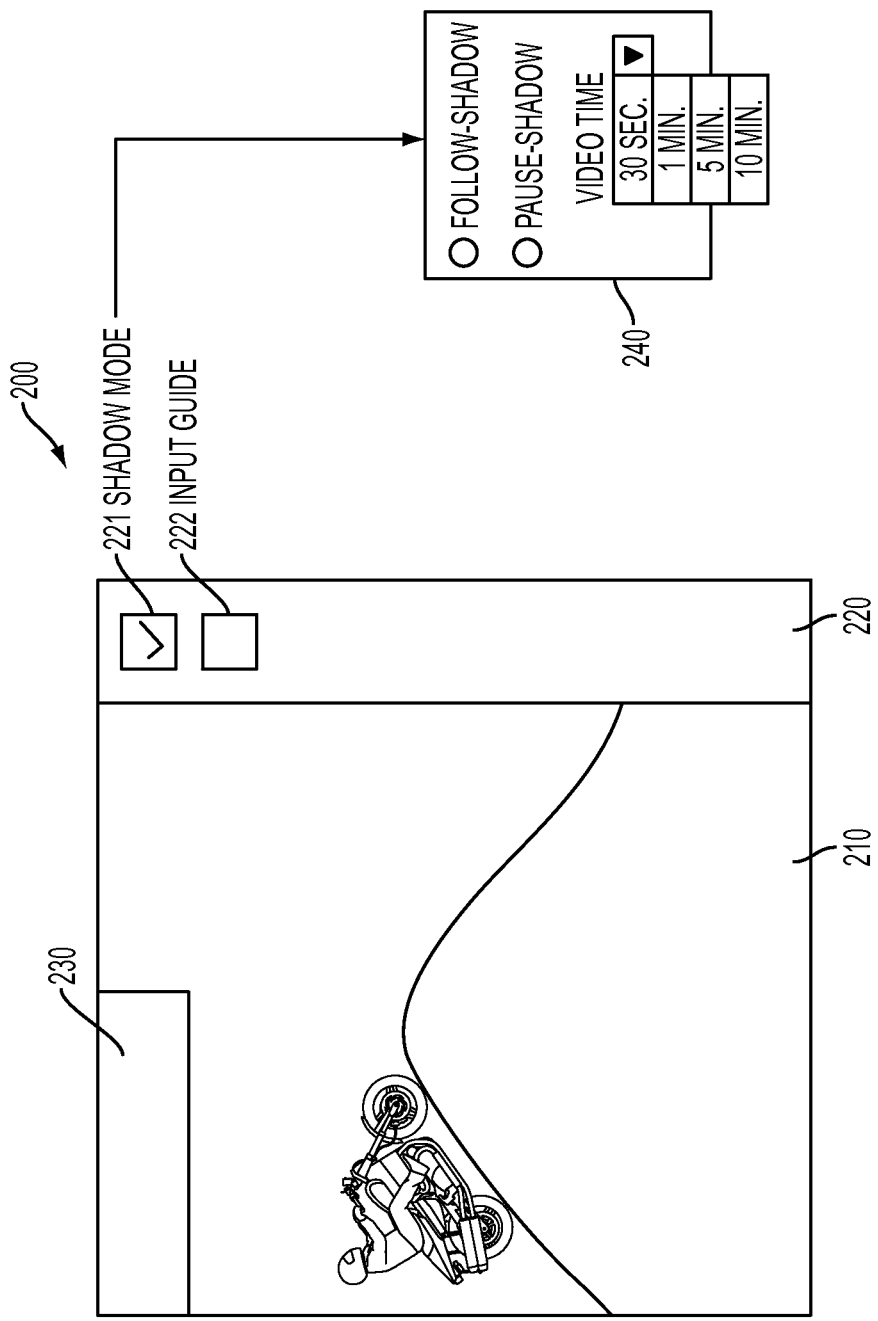
FIG. 2A illustrates a user interface for displaying game interactivity during a game play, in accordance with one embodiment of the present invention.

FIG. 2A illustrates a user interface 200 for displaying game interactivity during a game play, in accordance with one embodiment of the present invention. User interface 200 includes a game display 210, a control panel 220, and a status window 230. It should be understood that many configurations and designs for the user interfaces described herein are possible, so long as the functionality is provided. Game display 210 is used to display the frames of the video game currently played by a user. Control panel 220 includes a plurality of game controls that set the game play setting selections. In this example, the game controls in control panel 220 include a shadow mode 221 and an input guide 222. Control panel 220 may also include other game controls (not shown), such as tagging, tag data display, mini-game creation, etc.

In this embodiment, after shadow mode 221 is selected, a window 240 is popped up (or shown in any other displayable configuration) to enable the selection for either the follow-shadow mode or the pause-shadow mode and the selection for shadow mode view time. In one embodiment, the shadow mode view time is user selectable and defines a period of time during which the shadow mode is enabled for the game play. In other embodiments, the game system can set a default time or make the time adjustable depending on skill level. Further, the view time can be set by the video game, intermittently during the play of the video game, at selected times during play of the video game, or at times enabled by game cloud system 110.

Status window 230 may be used to display the game play status, the shadow mode selection for the game being played, the selected time gap for a selected shadow mode, the selected prior player or user, the shadow mode view time selection, etc. The game controls in control panel 220 and the selections in window 240 may be implemented in any forms, such as radio buttons, push buttons, drop-down menus, touch icons, voice activated, etc.

In one embodiment, input guide 222 in control panel 220 can be selected while shadow mode 221 is enabled. When input guide 222 in control panel 220 is selected, the game inputs entered by a selected prior user for at least one of the actions performed in the prior game will be displayed. The game inputs may be entered in the prior game in the form of inputs or a combination of inputs from a game controller, a mouse, a keyboard, a touch device, etc. In one embodiment, the game inputs may be displayed in a pop up window or other display icon(s).

Figure 2B:
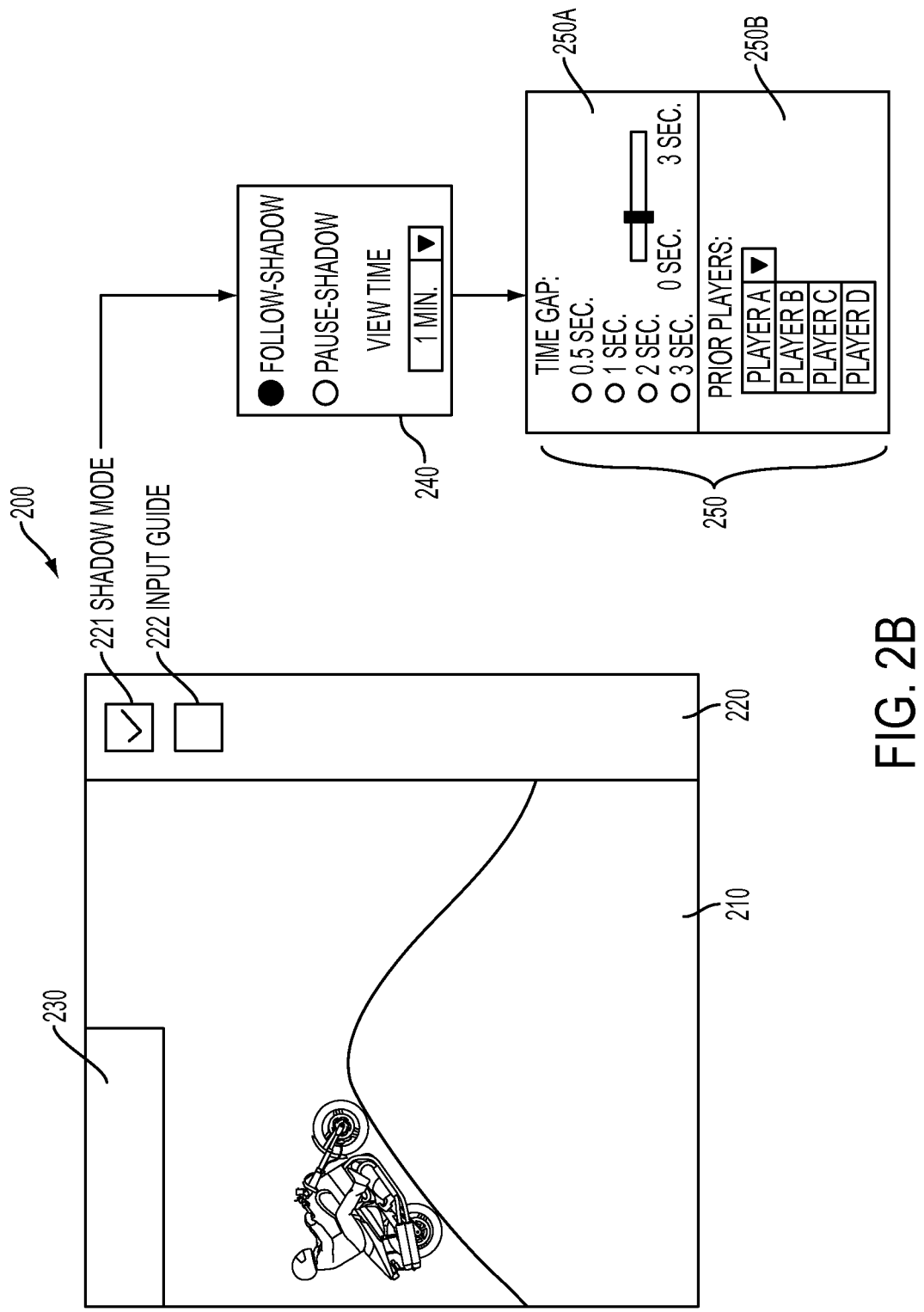
FIG. 2B illustrates follow-shadow mode setting selections, in accordance with one embodiment of the present invention.

FIG. 2B illustrates follow-shadow mode setting selections, in accordance with one embodiment of the present invention. In this embodiment, after the follow-shadow mode is selected in window 240, a pop up window 250 (or other display/control icons) will be displayed to enable the follow-shadow mode setting selections. Window 250 includes a time gap selection portion 250A and a prior player selection portion 250B. In the time gap selection portion 250A, the user may either select the time gap according to the provided fixed time gap settings (0.5 sec., 1 sec., 2 sec., or 3 sec.) or set the time gap using the slide bar. In the prior player selection portion 250B, the user may select a prior player from a prior player list. In one embodiment, the prior player list may list the playing score (not shown) for each of the prior players. In another embodiment, the prior players in the prior user list are dynamically discovered by identifying friends of the currently player from a social network. Although the selections in window 250 are implemented in the form of radio buttons, a slide bar, and a drop down menu, the selections for the follow-shadow mode may be implemented in any other forms. In this embodiment, the view time for the follow-shadow mode is set to be 1 minutes.

Figure 2C:
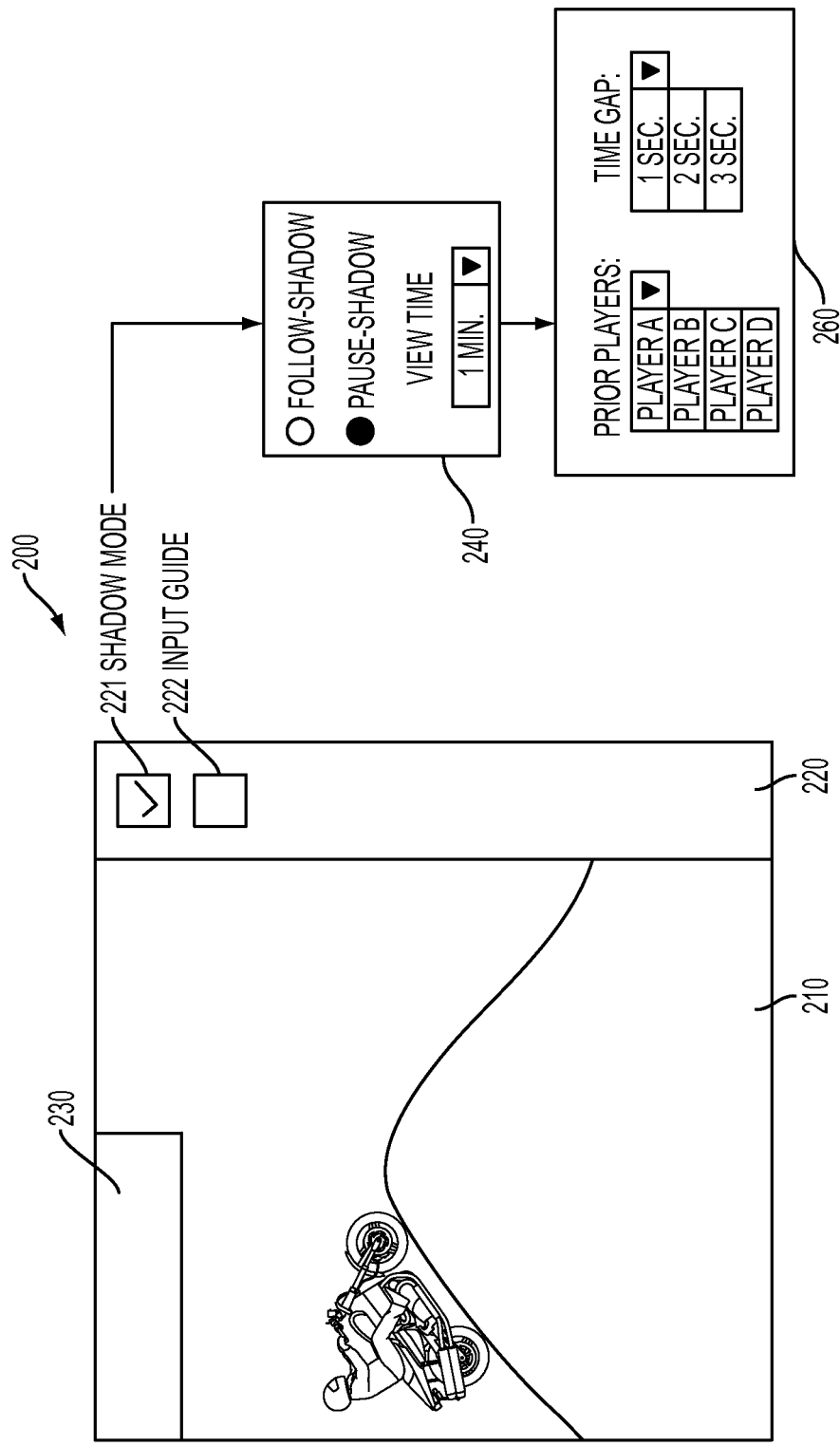
FIG. 2C illustrates pause-shadow mode setting selections, in accordance with one embodiment of the present invention.

FIG. 2C illustrates pause-shadow mode setting selections, in accordance with one embodiment of the present invention. In this embodiment, after the pause-shadow mode is selected in window 240, a pop up window 260 will be displayed to enable the pause-shadow mode setting selections. In this example, window 260 includes a selection for prior players and a selection for time gap for the pause-shadow mode play. In one embodiment, the prior players listed in the selection for prior players may list the playing score (not shown) for each of the prior players. In another embodiment, the prior players in the prior user list are dynamically discovered by identifying friends of the currently player from a social network. The time gap selection defines a pause separation between the actions performed by the selected prior user to move the image of the object of the video game in a shadow form along the game sequence during the prior game play and the actions to be performed by the current user to move the image of the object of the video game along the game sequence. Although the selections in window 260 are implemented in the form of drop down menus, the selections for the pause-shadow mode may be implemented in any other forms. In this embodiment, the view time for the pause-shadow mode is set to be 1 minutes.

Figure 2D:
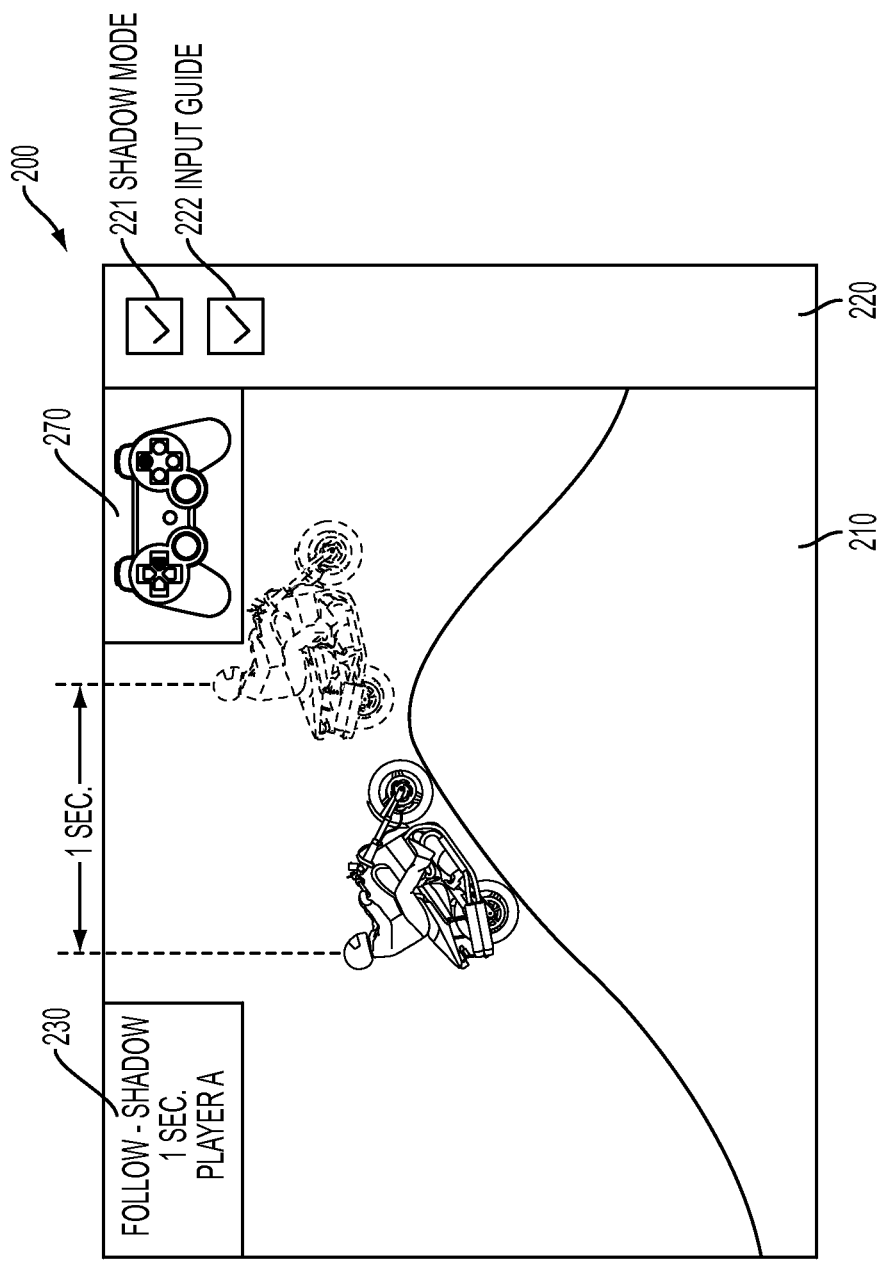
FIG. 2D illustrates a user interface having an input guide display, in accordance with one embodiment of the present invention.

FIG. 2D illustrates a user interface 200 having an input guide display, in accordance with one embodiment of the present invention. In this example, the follow-shadow mode for player A is selected and the time gap selected for the follow-shadow mode is 1 second. The selections for the shadow mode, the time gap, and the prior player are shown in status window 230. The pop-up window 270 is displayed after input guide 222 in control panel 220 is selected. The pop-up window 270 shows the input device (a game controller) used by player A to enter the control inputs for the game action shown in the game display 210. In this embodiment, the control inputs entered by player A for this game action are shaded in window 270. It is to be understood that the control inputs entered by a selected prior player may be displayed in other forms, such as highlights, colors, etc. If player A entered the game control inputs via another alternative input device, e.g., a keyboard, a touch device, or a mouse, this alternative input device along with the input keys or buttons may be shown in window 270.

Figure 2E:
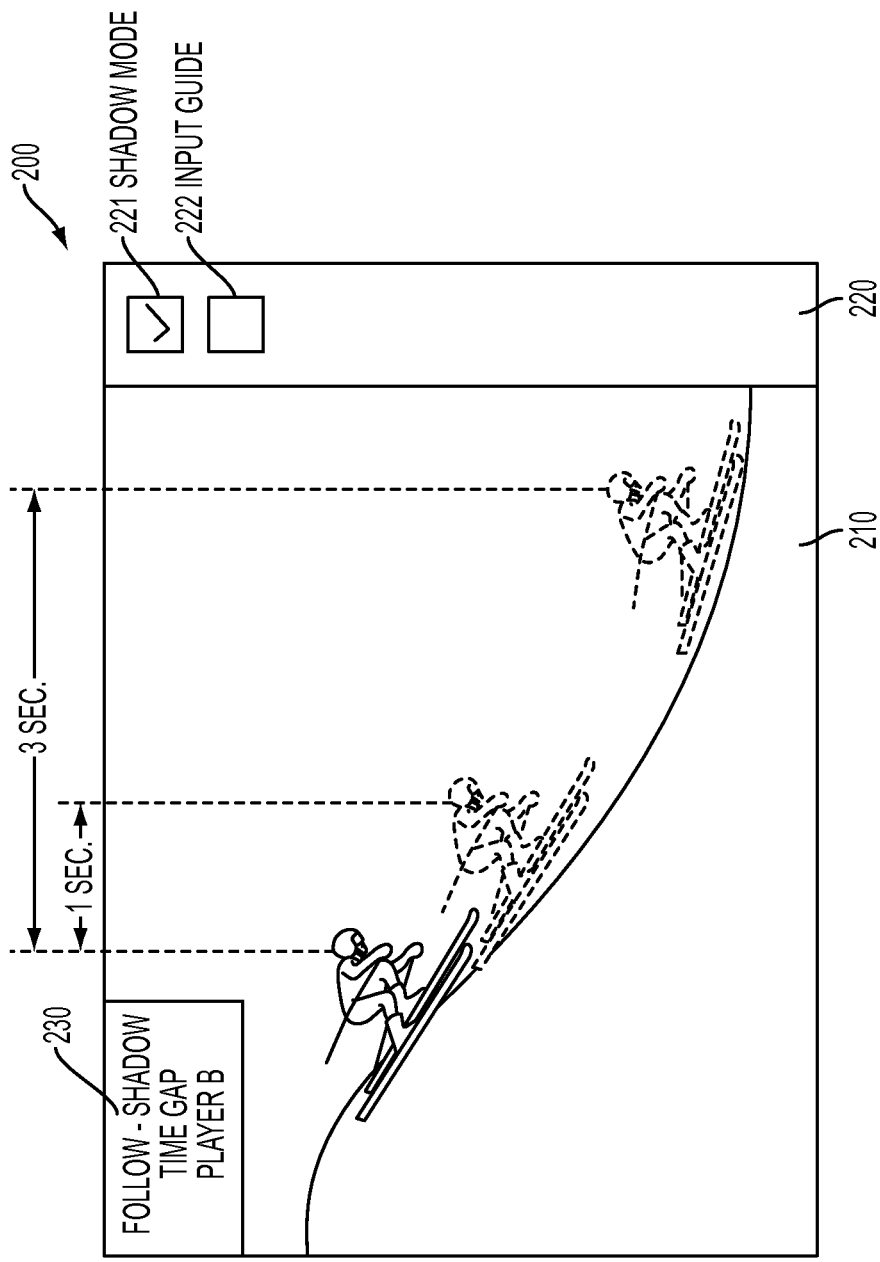
FIG. 2E illustrates a follow-shadow mode game play, in accordance with one embodiment of the present invention.

FIG. 2E illustrates a follow-shadow mode game play, in accordance with one embodiment of the present invention. In this embodiment, input guide 222 is not selected and the shadow form of the object controlled by player B in a prior game play is shown in dash-lined animation. As discussed above, when defining the selections for the follow-shadow mode, the user can set the time gap for the follow-shadow mode. FIG. 2E shows the game action when the time gap for the follow-shadow mode is set to 1 second or 3 second, respectively. The status window 230 shows the selected follow-shadow mode, the selected time gap, and the selected prior player (player B).

Figure 2F:
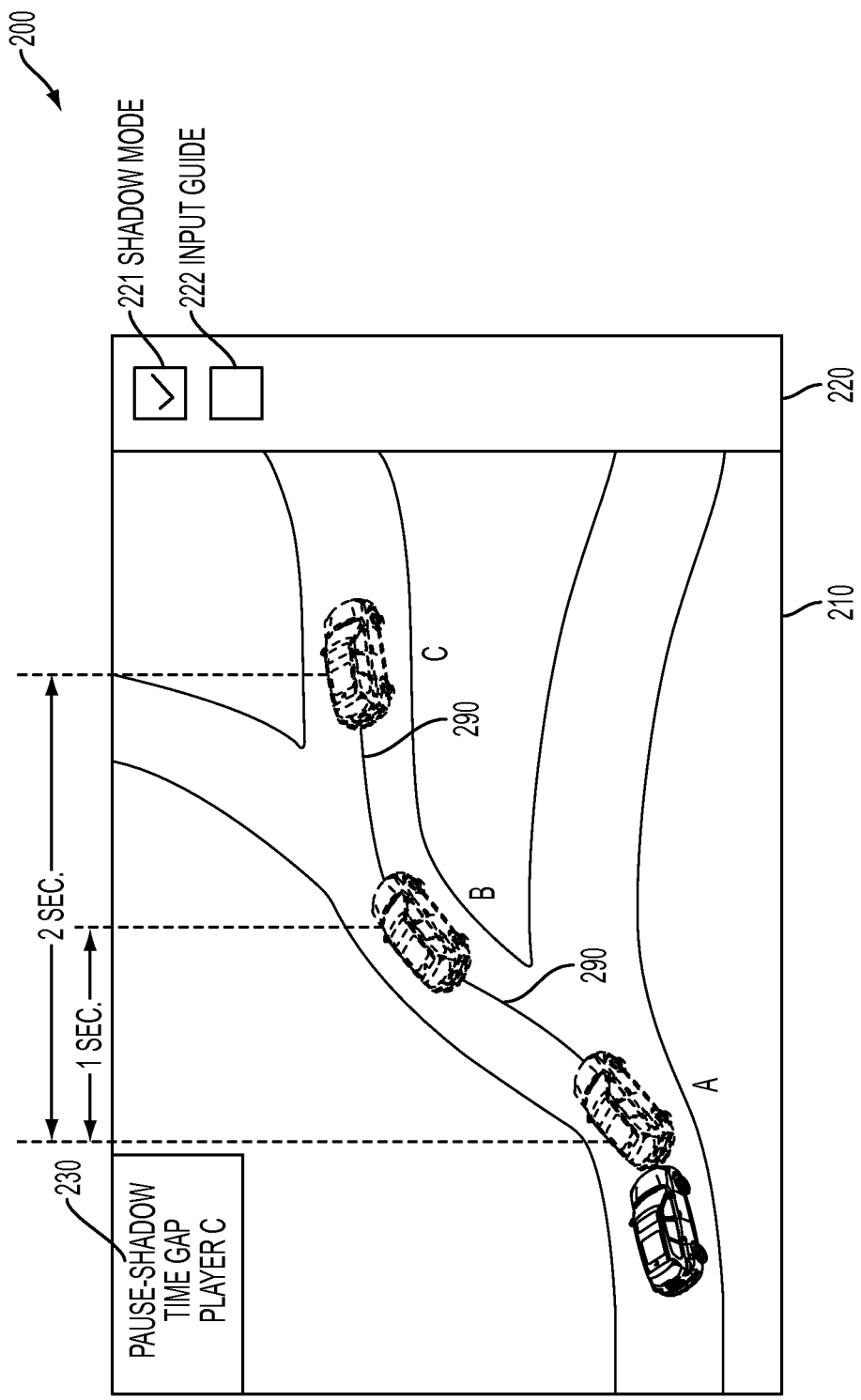
FIG. 2F illustrates a pause-shadow mode game play, in accordance with one embodiment of the present invention.

FIG. 2F illustrates a pause-shadow mode game play, in accordance with one embodiment of the present invention. In this embodiment, input guide 222 is not selected and the shadow form of the object controlled by player C in a prior game play is shown in dash-lined animation. When defining the selections for the pause-shadow mode, the user can set the time gap for the pause-shadow mode. FIG. 2F shows the game actions played along a game sequence 290 (represented by a solid line) when the time gap for the pause-shadow mode is set to 1 second or 2 second, respectively. The game sequence is defined by characteristics of the video game. In one embodiment, game cloud system 110 may provide for a selection of a plurality of video games and each video game has particular characteristics that define the game sequences for the selected games.

During the pause-shadow mode, the object (represented by the solid-lined car in this example) controlled by the current game player is paused during the selected time gap. When the time gap is set to 1 second, the object (represented by the dash-lined car) used for game actions performed by the selected prior player is shown progressing between the beginning point A and the ending point B. When the time gap is set to 2 second, the object (represented by the dash-lined car) used for game actions performed by the selected prior player is shown progressing between the beginning point A and the ending point C along the game sequence 290. In this embodiment, the status window 230 shows the selected pause-shadow mode, the selected time gap, and the selected prior player (player C).

Figure 3:
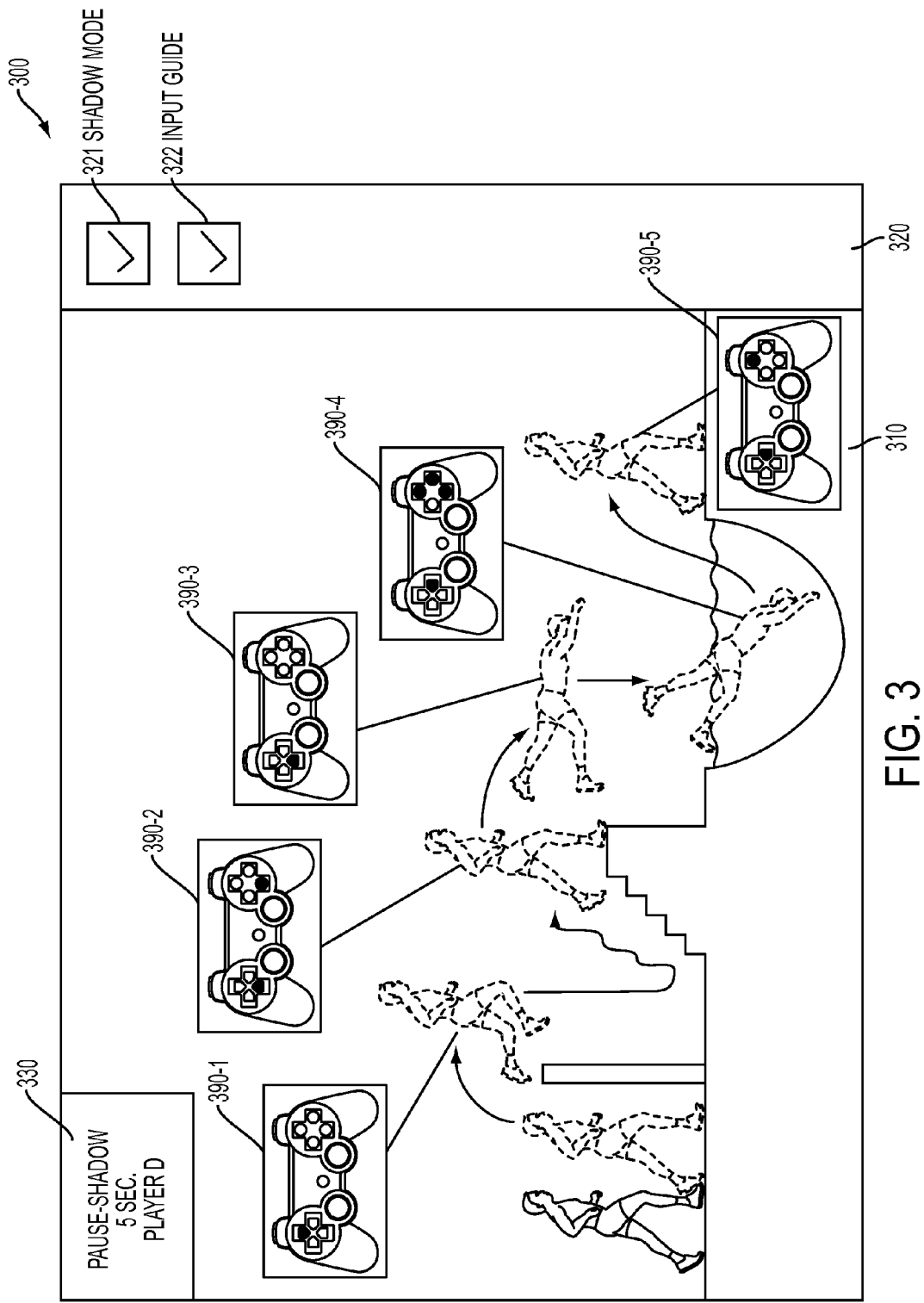
FIG. 3 illustrates a user interface 300 showing input guides of a prior user intermittently during a game play, in accordance with one embodiment of the present invention.

FIG. 3 illustrates a user interface 300 showing input guides of a prior user intermittently during a game play, in accordance with one embodiment of the present invention. User interface 300 includes a display 310, a control panel 320, and a status window 330. The display 310 shows the video frames of a game played by a user. The control panel 320 includes a shadow mode control 321 and an input guide control 322, both of which are enabled. The status window 330 indicates that the pause-shadow mode is selected, the selected time gap is 5 seconds, and the identified prior player is player D.

In this example, the object controlled by the current player is shown in solid-lined form, while the objects controlled by the prior user (Player D) are shown in dash-lined forms. The game control inputs entered by player D during a prior game play is set to be displayed intermittently when the object controlled by player D is going to perform any major actions, for example, jumping over a wall, jumping from the top of a stair, diving into the water, climbing up to shore, etc. The inputs or combination of inputs entered by player D, in this embodiment, are shown in various pop-up windows (390_1 to 390_5) associated with the identified actions.

Figure 4:
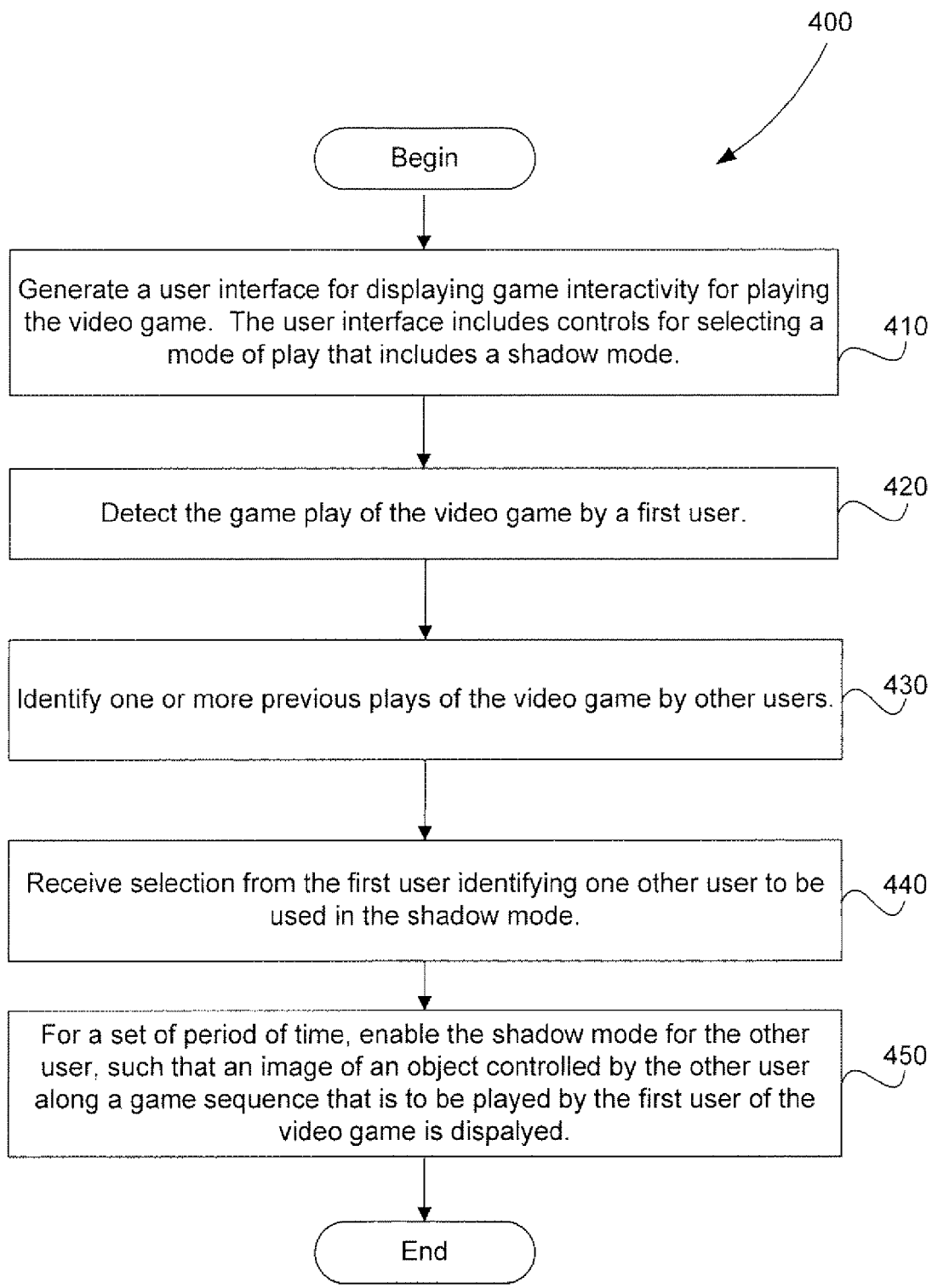
FIG. 4 is a flow chart illustrating an exemplary method for playing a video game executed by a game cloud system over an online network, in accordance with one embodiment of the present invention.

FIG. 4 is a flow chart illustrating an exemplary method 400 for playing a video game executed by a game cloud system over an online network, in accordance with one embodiment of the present invention. In one embodiment, the illustrated exemplary method 400 is described in relation to operations performed by game cloud system 110 as shown in FIG. 1A.

At operation 410, a user interface is generated for displaying game interactivity for playing the video game. The user interface may include controls for selecting a mode of play, and the mode of play includes a shadow mode. In one embodiment, the shadow mode includes a follow-shadow mode and a pause-shadow mode. The view time of the shadow mode may be set by the user during a part of the game play, at selected time of the game play, intermittently during the game play or at times enabled by game cloud system 110.

At operation 420, a game play by a first user for an available game title is detected, for example, by game cloud system 110. The game played by the first user may be a full game title available to the first user or a mini-game defined from a part of a full video game. The game may be executed by game execution engine 170 of game cloud system 110.

At operation 430, one or more previous plays of the video game by other users (or prior users) are identified. In one embodiment, the other users are dynamically discovered by identifying friends of the first user from a social network, e.g., from a social media provider 140 by social connection manager 195 of game cloud system 110.

At operation 440, a selection from the first user identifying one other user to be used in the shadow mode is received. In addition to the selection of one of the other users to be used in the shadow mode, a time gap may be selected by the first user to be used during the shadow mode game play.

At operation 450, after setting a period of time, the shadow mode of the selected other user is enabled. The enabling of the shadow mode displays an image of an object controlled by the other user along a game sequence that is to be played by the first user of the video game. The period of time is user selectable. In one embodiment, the period of time can be during part of the video game, intermittently during the play of the video game, at selected times during the play of the video game, or at times enabled by a game cloud system.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for playing a video game over an online network, the video game being executed by a game cloud system, comprising:
generating, by a processor, a graphical user interface, on a display of a client coupled to the game cloud system over the online network, for displaying game interactivity for playing the video game, the graphical user interface including controls for selecting a mode of play, the mode of play including a shadow mode;
detecting, by the processor, game play of the video game by a first user;
detecting, by the processor, enablement of the shadow mode, the enablement of the shadow mode causing rendering of a selection interface of the graphical user interface that lists other users of the video game, the other users being automatically discovered as friends of the first user from an online social network that includes a social graph, wherein the social graph includes existing relationships between the first user and the other users, and wherein the social graph is stored on one or more memory devices of the game cloud system and/or a remote third party server;
identifying, by the processor, one or more previous plays of the video game by other users, each of the one or more previous plays includes a first game character operated by the respective other user in the one or more previous plays of the video game;
receiving, by the processor, a selection from the first user, via one or more input devices of the client, identifying one of the other users and a respective one of the one or more previous plays of the identified other user to be used in the shadow mode;
receiving, by the processor, a setting for a time gap, the time gap setting defining a separation timing between operations of the first game character of the identified other user performed in the respective one of the one or more previous plays of the identified other user and operations of a second game character operated by the first user to be performed during the shadow mode; and
for a set period of time set in response to the received setting of the time gap, enabling the shadow mode, such that enabling the shadow mode displays an image of the first game character controlled by the identified other user during the respective one of the one or more previous plays of the video game along a game sequence that is to be played by the first user of the video game; and
receiving, by the processor, the operations of the second game character for play of the game sequence of the video game, via the one or more input devices of the client, concurrently while the operations of the first game character during the respective one of the one or more previous plays are displayed in the game sequence of the video game.

2. The method of claim 1, wherein the graphical user interface provides controls for enabling interactivity input from at least the first user playing the video game via the graphical user interface provided by the game cloud system when the video game is executed.

3. The method of claim 1, wherein the shadow mode includes a follow-shadow mode, the follow-shadow mode including,
settings for defining a follow separation for the separation that defines the time gap between (i) actions performed by the identified other user to move the image of the first game character of the video game in a shadow form along the game sequence during the respective one of the one or more previous plays and (ii) actions to be performed by the first user to move a respective image of the second game character of the video game along the game sequence,
wherein the second game character of the video game controlled by the first user is enabled to move behind the shadow form of the first game character of the identified other user while the first user plays the video game.

4. The method of claim 3, further comprising,
enabling display of input guides as an overlay, on the graphical user interface, for at least one of the actions performed by the identified other user to move the image of the first game character of the video game while showing the shadow form moving along the game sequence.

5. The method of claim 3, wherein the time gap is settable when playing the video game.

6. The method of claim 1, wherein the game sequence is defined by characteristics of the video game, the game cloud system providing for selection of a plurality of video games and each video game having particular characteristics that define the game sequences for the selected games.

7. The method of claim 4, wherein the shadow form is defined as one of a fully animated version, a minimally animated version, a grayed animation, a dash-lined animation, a partially transparent animation, or combinations or variance of degree thereof.

8. The method of claim 1, wherein the period of time can be during part of the video game, intermittently during play of the video game, at selected times during play of the video game, or at times enabled by the game cloud system.

9. The method of claim 1, wherein the video game is a mini-game defined from a part of a full video game.

10. The method of claim 1, wherein the shadow mode includes a pause-shadow mode, the pause-shadow mode including,
    settings for defining a pause separation for the separation that defines the time gap between (i) actions performed by the identified other user to move the image of the first game character of the video game in a shadow form along the game sequence during the respective one of the one or more previous plays and (ii) actions to be performed by the first user to move a respective image of the second game character of the video game along the game sequence,
    wherein the second game character of the video game controlled by the first user is paused during the time gap, and during the time gap the shadow form of the first game character is shown progressing between a beginning point of the separation to an ending point of the separation.

11. The method of claim 10, further comprising,
    enabling display of input guides as an overlay, on the graphical user interface, for at least one of the actions performed by the identified other user to move the image of the first game character of the video game while showing the shadow form moving along the game sequence.

12. The method of claim 10, wherein the time gap is settable when playing the video game.

13. The method of claim 10, wherein the shadow form is defined as one of a fully animated version, a minimally animated version, a grayed animation, a dash-lined animation, a partially transparent animation, or combinations or variance of degree thereof.

14. A computer readable non-transitory storage media having executable program instructions stored thereon for playing a video game, which when executed by a game cloud system over an online network, cause the game cloud system to perform operations of:
    generating a graphical user interface, on a display device of a client coupled to the game cloud system over the online network, for displaying game interactivity for playing the video game, the graphical user interface including controls for selecting a mode of play, the mode of play including a shadow mode;
    detecting game play of the video game by a first user;
    detecting enablement of the shadow mode, the enablement of the shadow mode causing rendering of a selection interface of the graphical user interface that lists other users of the video game, the other users being automatically discovered as friends of the first user from an online social network that includes a social graph, wherein the social graph includes relationships between the first user and the other users, and wherein the social graphic is stored on the non-transitory storage media of the game cloud system and/or a remote third party server;
    identifying one or more previous plays of the video game by other users, each of the one or more previous plays includes a first game character operated by the respective other user in the one or more previous plays of the video game;
    receiving selection from the first user, via one or more input devices coupled to the client, identifying one of the other users and a respective one of the one or more previous plays of the identified other user to be used in the shadow mode;
    receiving a setting for a time gap, the time gap setting defining a separation timing between operations of the first game character of the identified other user performed in the respective one of the one or more previous plays of the identified other user and operations of a second game character operated by the first user to be performed during the shadow mode; and
    in response to the received setting of the time gap, enabling the shadow mode for a set period of time, such that enabling the shadow mode displays an image of the first game character controlled by the identified other user during the respective one of the one or more previous plays of the video game along a game sequence that is to be played by the first user of the video game.

15. The computer readable non-transitory storage media of claim 14, wherein the graphical user interface provides controls for enabling interactivity input from at least the first user playing the video game via the graphical user interface provided by the game cloud system when the video game is executed.

16. The computer readable non-transitory storage media of claim 14, wherein the game sequence is defined by characteristics of the video game, the game cloud system providing for selection of a plurality of video games and each video game having particular characteristics that define the game sequences for the selected games.

17. The computer readable non-transitory storage media of claim 14, wherein the period of time can be during part of the video game, intermittently during play of the video game, at selected times during play of the video game, or at times enabled by the game cloud system.

18. The computer readable non-transitory storage media of claim 14, wherein the video game is a mini-game defined from a part of a full video game.

19. The computer readable non-transitory storage media of claim 14, wherein the shadow mode includes a follow-shadow mode and a pause-shadow mode,
    the follow-shadow mode includes settings for defining a follow separation for the separation that defines a first time gap between (i) actions performed by the identified other user to move the image of the first game character of the video game in a shadow form along the game sequence during the respective one of the one or more previous plays and (ii) actions to be performed by the first user to move a respective image of the second game character of the video game along the game sequence, wherein the second game character of the video game controlled by the first user is enabled to move behind the shadow form of the first game character of the identified other user while the first user plays the video game, and
    the pause-shadow mode includes settings for defining a pause separation for the separation that defines a second time gap between (i) actions performed by the identified other user to move the image of the first game character of the video game in a shadow form along the game sequence during the respective one of the one or more previous plays and (ii) actions to be performed by the first user to move the respective image of the second game character of the video game along the game sequence, wherein the second game character of the video game controlled by the first user is paused during the time gap, and during the time gap the shadow form of the first game character is shown progressing between a beginning point of the separation to an ending point of the separation.

* * * * *